May 9, 1933.  A. W. WADSWORTH  1,907,909
WATCH CASE
Filed Jan. 29, 1930    2 Sheets-Sheet 1

INVENTOR.
Arthur W. Wadsworth
BY Allen + Allen
ATTORNEYS.

May 9, 1933.                A. W. WADSWORTH                1,907,909
                              WATCH CASE
                         Filed Jan. 29, 1930              2 Sheets-Sheet 2
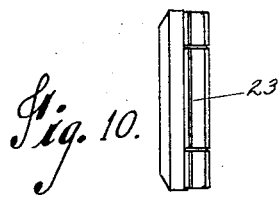
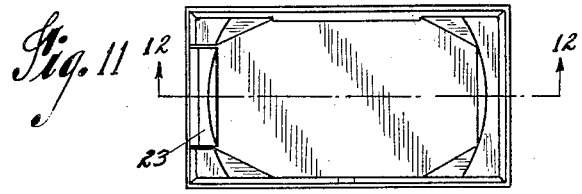
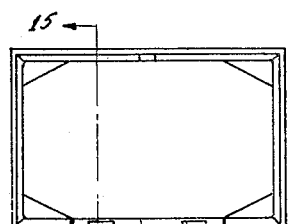
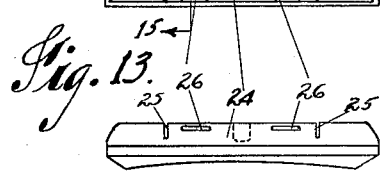
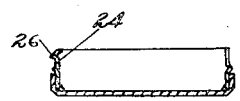
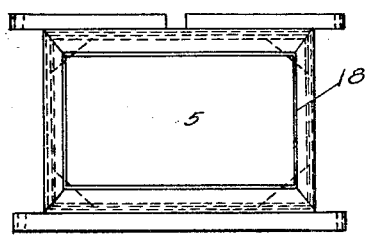
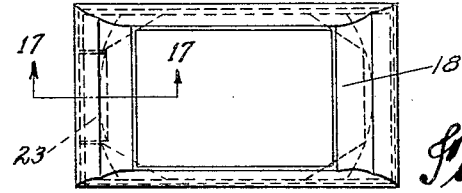
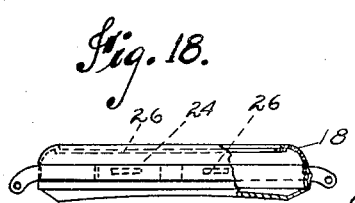
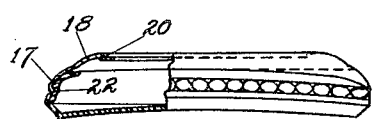
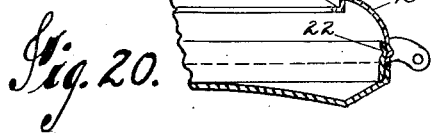
INVENTOR.
Arthur W. Wadsworth
by Allen & Allen, ATTORNEYS Patented May 9, 1933

1,907,909

UNITED STATES PATENT OFFICE

ARTHUR W. WADSWORTH, OF FORT THOMAS, KENTUCKY, ASSIGNOR TO THE WADSWORTH WATCH CASE CO., OF DAYTON, KENTUCKY, A CORPORATION OF KENTUCKY

WATCH CASE

Application filed January 29, 1930. Serial No. 424,339.

My invention relates to watch cases and particularly the watch cases of the wrist watch type.

In the manufacture of watches, it has been customary for one manufacturer to make the works or movements and to purchase from other manufacturers the case within which the works are mounted.

The cases are generally of two types, either having both a removable bezel for the crystal and a removable back, or having only the removable bezel, the body and back being integrally formed and of generally box shape. In the first type, the movements are generally held in place with screws, which, while entailing certain disadvantages and necessitating the taking of certain precautions, nevertheless facilitates quantity manufacture, since the cases may be uniformly made slightly oversize. It is with the second type that my invention is more particularly concerned. Here the cases are made as uniformly as possible to a certain gauge, which is the standard size of the movement; and it is the intention that the movements shall fit snugly within the socket portion of the case so as to be held both against substantial displacement in all directions and against rattling. This intention is not always fully realized in practice. Both the cases and the movements vary slightly in size. If the movement be small or the case large, the fit is unsatisfactory and a new case or movement must be chosen. Consequently the cases cannot be made deliberately slightly oversize. If the movement be large or the case small, careful filing, grinding, or machining operations are necessary, and these consume time. A large movement cannot be forced into a small case without serious danger of destroying its delicate adjustment. Further, where the fit is no more than necessarily tight for the purpose, movements are frequently damaged by the repair man in prying them out of the case; and they seldom fit perfectly after one or more removals. Nevertheless this difficulty has never been met with a satisfactory solution, and the cases are ordinarily manufactured as open receptacles having sufficient depth to receive the works or the watch movement with its mounting plates, and the side walls of the case are made to approximate such dimensions as will allow the movement to be fitted snugly within the case, providing both are of exactly standard size, notwithstanding the fact that in large scale manufacture exactly standard dimensions are not attainable with complete regularity.

It is the object of my invention to provide a case havilng resilient means which will allow for certain over size of the watch movement and which will also, in case the movement is too small, snugly retain the movement free from any looseness in the mounting.

The above object and other objects to which reference will be made in the ensuing disclosure, I accomplish by that certain combination and arrangement of parts of which I have shown preferred embodiments.

Referring to the drawings:—

Figures 10 and 11 illustrate a type of case in which the resilient member is located at the end.

Figure 12 is a sectional view of the case of Figure 11 along the lines 12—12.

Figures 13 and 14 illustrate a case having a resilient tongue in the side, the tongue being provided with means cooperative with the cover or bezel whereby it is held in resilient contact with the movement.

Figure 15 is a section along the lines 15—15 of Figure 13.

Figure 1:
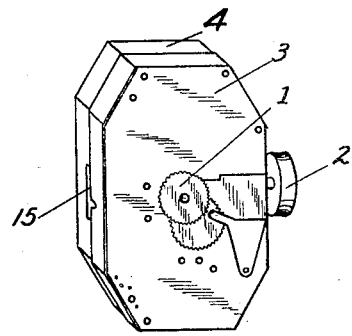
Figure 1 is a perspective view of the watch movement with its mounting plates.
Figure 2:
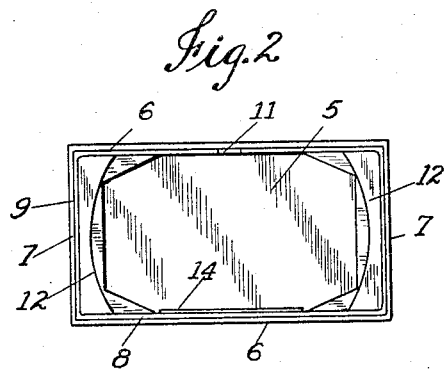
Figure 2 is a plan view of the lower part of the case.
Figure 4:
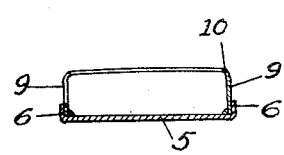
Figure 4 is a sectional view taken along the lines 4—4 in Figure 3.
Figure 3:
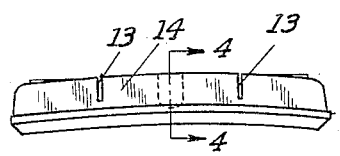
Figure 3 is a side elevation of the lower part of the case shown in Figure 2.
Figure 5:
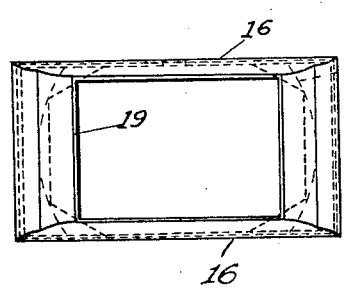
Figure 5 is a top plan view of the upper part of the case.
Figure 6:
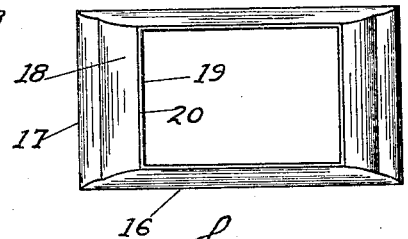
Figure 6 is a bottom plan view of the upper part of the case.
Figure 7:
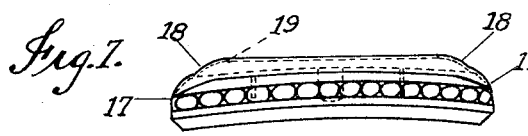
Figure 7 is a side elevation of the assembled case.
Figure 8:
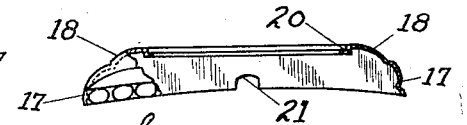
Figure 8 is a sectional side elevation of the upper part of the case or cover.
Figure 9:
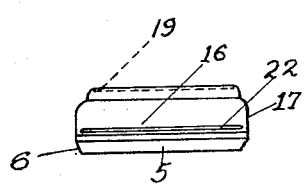
Figure 9 is an end elevation of the assembled case.

Figures 16 an 17 show the cover in place upon the case of Figures 10 and 11, Figure 17 being partly in section on the line 17—17 of Figure 16.

Figures 18 and 19 show the cover in place upon the case of Figures 13 and 14.

Figure 20 is a partial section thereof.

The watch movement 1, with the winding stem 2, is mounted in top and bottom supporting plates 3, 4. The side and end walls of the members 3 and 4 in the past have been required to fit snugly within the case and where such fit was not exact, a laborious cutting operation on the walls of the receiving case was necessary or if the walls of the members 3 and 4 fit too loosely, the works of the watch movement would shake within the case. The case is composed of a bottom member or receptacle having a bottom plate 5 with upstanding flanged side walls 6 and end walls 7. Received within the flanges 6 and 7, as has been common practice, I provide a case member having side walls 8 and end walls 9. Ordinarily this case member is soldered in position within the flanged sides of the bottom cover member 5. An opening 10 is provided in the case member noted and a slot 11 is provided to receive the winding stem.

Ordinarily the walls 8 have been bent over providing a flanged portion 12 which may be stamped in a desirable shape to conform with the design of the case. The wall 8 opposite the wall having the slot 11 therein has ordinarily been a solid wall and the portions of the case surrounding the opening 10 have been substantially rigid.

The essence of my invention consists in providing slots 13 in the wall 8 opposite the wall having the stem slot which release a spring portion 14 of the side wall 8 which can be bent inwardly and which will thereby provide a resilient plate which will allow for expansion to fit various size movements and which will, after the works are mounted, continue to press resiliently against the works and hold them in position. It will be noted that the supporting plates 3 and 4 for the movement, have an opening 15 between their meeting faces, and in case the slots 13 should register with openings between the supporting plates, dust might get into the works movement. Therefore, I contemplate only extending the slots 13 to sufficient depth as not to register with any opening in the supporting plates for the works movement thereby preventing any chance of dust getting into the works because of my provision of a case which will resiliently enclose the works movement.

The cover for the works receptacle has side walls 16 and end walls 17 with flanged portions 18 within which there is an opening 19 shaped to correspond with the design of the watch and which has a rectangular flanged ledge 20 for the reception of the watch crystal. One of the side walls has a slot 21 which registers with the slot 11 and fits snugly about the winding stem. The cover ordinarily is of such size that the end and side walls 16, 17 will frictionally engage the walls 8 and 9 of the works receptacle and indented portions 22 may be provided to increase the frictional seating of the case cover on the receptacle part of the case.

The exact location of the resilient portion is relatively unimportant. It is preferable to locate it in the side of the case in many instances because here it may be made broader so as to have a greater bearing surface. But it may be located, usually with equal effect, in the end of the case, as at 23 in Figures 10 and 11. I may, however, provide more than one resilient member located at opposite sides or ends, or at both sides and ends, though this is not necessary.

My invention also contemplates means for pressing the resilient member into positive though resilient contact with the movement. To this end the tongue 24 of Figure 14, set off by slots 25, is provided with raised portions or beads 26 projecting outwardly. The exact shape of these is unimportant. Their function will be apparent from a consideration of Figure 19 where the cover is shown in place. The plane sides of this cover when in place contact these beads, and by means of them press the resilient tongue 24 inwardly against the movement. Thus while the natural resiliency of the metal is still preferably utilized, it is not necessary to rely upon a permanent inward set of the metal, which might render the insertion of the movement more difficult. In this form, the movement is fitted into the case more loosely than the ultimately desired fit, the positioning of the cover serving to clamp the parts together.

While I have only shown cases of rectangular shape, the invention may be practiced on other types of cases as will be obvious.

Having thus described my invention, what I claim as new and desire to secure by Letters Patent, is:—

1. A watch case comprising a receptacle member and a cover member, said members having overlapping sides forming a joint, and the sides of the receptacle member being slotted, forming a spring portion between the slots adapted to bear resiliently against a wall of the works when said works are received within said receptacle member and to thereby hold said works in non-rattling position within said receptacle member.

2. A watch case comprising a receptacle member and a cover member, said members having overlapping sides forming a joint, and the sides of the receptacle member being slotted, forming a spring portion between the slots adapted to bear resiliently against a wall of the works when said works are received within said receptacle member and to thereby hold said works in non-rattling position within said receptacle member, the depth of the slots of said slotted portion terminating short of said sealed joint of the overlapping portions.

3. A watch case having a receptacle member with upstanding sides having slots with the portion between the slots bent inwardly, forming a spring to bear against the side edges of the works mounting plate when said plate is inserted within said receptacle member.

4. A watch case for receiving a watch movement having an opening of substantially the size of the mounting plate of a movement which the case is to retain, said case having an integrally formed spring portion adapted to yield with the insertion of the mounting plate of the movement, and to thereafter bear against said mounting plate to hold said movement in non-rattling position.

5. A watch case for resiliently retaining a watch movement, having slots leaving a portion of said case adapted to bend relatively to other portions of said case, to resiliently bear against said movement.

6. A watch case for resiliently retaining a watch movement, having slots leaving a portion of said case adapted to bend relatively to other portions of said case, to resiliently bear against said movement, the structure of said movement having openings into said movement, and the depth of the slots of said slotted portion being insufficient to extend into registry with said openings into said movement, whereby dust is excluded from said movement.

ARTHUR W. WADSWORTH.